(12) United States Patent  
Wobben

(10) Patent No.: US 7,481,624 B2
(45) Date of Patent: Jan. 27, 2009

(54) BUTT CONNECTION FOR HOLLOW PROFILE MEMBERS

(76) Inventor: Aloys Wobben, Argestrasse 19, Aurich (DE) D-26607

( * ) Notice: Subject to any disclaimer, the term of this patent is extended or adjusted under 35 U.S.C. 154(b) by 402 days.

(21) Appl. No.: 11/289,113

(22) Filed: Nov. 28, 2005

(65) Prior Publication Data

US 2006/0083611 A1 Apr. 20, 2006

Related U.S. Application Data

(63) Continuation of application No. 10/168,814, filed as application No. PCT/EP00/13167 on Dec. 22, 2000, now abandoned.

(30) Foreign Application Priority Data

Dec. 24, 1999 (DE) ............................... 199 62 989

(51) Int. Cl.
*F03D 11/00* (2006.01)

(52) U.S. Cl. ............................. 416/132 B; 416/204 R; 416/205; 416/207; 416/225; 416/226; 416/233; 403/14; 403/286; 403/292; 403/293; 403/294; 403/402; 403/408.1; 403/409.1; 403/DIG. 15; 411/354; 29/889.7; 29/889.71; 29/889.72

(58) Field of Classification Search ............. 416/132 R, 416/132 B, 142, 143, 204 R, 204 A, 205, 416/207, 212 R, 212 A, 225–226, 232–233, 416/229 R, 229 A, 230; 403/13–14, 286, 403/292, 293–294, 402, 408.1, 409.1, DIG. 15; 411/354; 29/889.6, 889.61, 889.7, 889.71, 29/889.72

See application file for complete search history.

(56) References Cited

U.S. PATENT DOCUMENTS

| 706,974 | A |  | 8/1902 | Lyle ............................ 403/293 |
| 2,125,882 | A |  | 8/1938 | Berliner ....................... 244/124 |
| 2,140,772 | A |  | 12/1938 | Slayter et al. ..................... 20/1 |
| 2,722,294 | A |  | 11/1955 | Lagaard et al. ................ 189/37 |
| 3,310,327 | A |  | 3/1967 | Tremblay ............... 287/189.36 |
| 3,469,865 | A |  | 9/1969 | Ellenburg ................... 285/330 |
| 3,825,360 | A |  | 7/1974 | Galich ......................... 403/294 |
| 3,855,754 | A |  | 12/1974 | Scoville et al. ................ 52/755 |
| 3,884,002 | A |  | 5/1975 | Logie ........................... 52/285 |
| 3,985,461 | A |  | 10/1976 | Gebhard ..................... 403/292 |
| 4,116,573 | A |  | 9/1978 | Fuchs ......................... 403/264 |
| 4,283,898 | A |  | 8/1981 | Claver ......................... 52/584 |
| 4,389,162 | A | * | 6/1983 | Doellinger et al. .......... 416/225 |

(Continued)

FOREIGN PATENT DOCUMENTS

AT 375 440 8/1984

(Continued)

*Primary Examiner*—Christopher Verdier
(74) *Attorney, Agent, or Firm*—Seed IP Law Group PLLC

(57) ABSTRACT

A butt connection of divided hollow profile members, which is suitable in particular for rotor blades of wind power installations, comprises a multiplicity of straps which are arranged along the joint and which bridge over same and which are respectively fixed with their ends to one of the profile members to be connected. In this respect the arrangement is preferably such that one of the two bolts fixing the strap at the ends thereof has a wedge-shaped flattening, by means of which a tensile prestressing can be imparted to the strap.

23 Claims, 3 Drawing Sheets

U.S. PATENT DOCUMENTS

| | | | |
|---|---|---|---|
| 4,474,536 A | 10/1984 | Gougeon et al. | 416/226 |
| 4,569,167 A | 2/1986 | Staples | 52/90 |
| 4,661,008 A | 4/1987 | Norihiro | 403/294 |
| 5,078,534 A | 1/1992 | White | 403/292 |
| 5,521,951 A | 5/1996 | Charnley et al. | 376/260 |
| 5,530,219 A | 6/1996 | Offer et al. | 219/137 R |
| 5,729,581 A | 3/1998 | Loock et al. | 376/260 |
| 5,741,083 A | 4/1998 | Schvartz | 403/297 |
| 5,803,686 A | 9/1998 | Erbes et al. | 411/55 |
| 5,896,980 A | 4/1999 | Butler | 198/836.1 |
| 6,067,338 A | 5/2000 | Erbes | 376/302 |
| 6,167,618 B1 | 1/2001 | Weems et al. | 29/890.031 |
| 6,345,927 B1 | 2/2002 | Pao et al. | 403/294 |
| 6,571,524 B2 | 6/2003 | Pantelides et al. | 52/582.1 |
| 6,648,541 B1 | 11/2003 | Müller et al. | 403/286 |

FOREIGN PATENT DOCUMENTS

| | | |
|---|---|---|
| DE | 29 21 152 | 11/1980 |
| DE | 34 35 458 C2 | 6/1986 |
| DE | 43 08 540 A1 | 9/1994 |
| DE | 44 44 439 A1 | 4/1995 |
| DE | 44 28 730 A1 | 2/1996 |
| DE | 197 41 129 C1 | 5/1999 |
| EP | 0 049 906 A1 | 4/1982 |
| EP | 0 892 177 A1 | 1/1999 |
| GB | 1133931 | 11/1968 |
| JP | 53-007931 | 10/1974 |
| JP | 53-0006774 | 6/1975 |
| JP | 55-119810 | 2/1979 |
| JP | 63-188312 | 12/1988 |
| JP | 2524972 | 3/1991 |

* cited by examiner

BUTT CONNECTION FOR HOLLOW PROFILE MEMBERS

BACKGROUND OF THE INVENTION

1. Field of the Invention

The invention concerns the use of a butt connection between components, in which straps arranged along a butt joint bridge over the butt joint and are respectively fixed with their ends directly to one of the components to be connected with a small longitudinal spacing from the butt joint.

2. Description of Related Art

Similarly to aircraft propellers, the rotors of wind power installations have rotor blades comprising a load-bearing spar or beam member—in most cases with an upper and a lower flange—and a hollow profile member which determines the aerodynamic properties of the rotor. Nowadays the hollow profile members generally comprise composite materials, namely glass or carbon fibers with polyester or epoxy resins as binders. What has become the usual practice is producing the rotor blade hollow profile members (whose cross-section generally changes over the length thereof) in the form of two longitudinally divided half-shell portions which are assembled to the spar to form the finished blade.

With the increasing power of modern wind power installations, the rotors thereof are also becoming larger in diameter, which requires the production of correspondingly longer rotor blades. If the production of such long rotor blades, that is to say the half-shell portions required for same, in one piece, is already not without its problems (inter alia because of the correspondingly large factory building), transportation which is then required to the location at which the wind power installation is erected represents a serious obstacle.

DE 29 21 152 A1 discloses a transversely divided rotor blade whose hollow profile member parts are connected by means of the butt connection described in the opening part of this specification. In that arrangement the ends of the profile member parts are engaged by tensile anchors, between which the clamping elements in the form of steel cables or steel plates are tensioned, which pass through in the interior of the profile member parts over the blade length, possibly also through additional intermediate anchors. That arrangement gives rise to problems insofar as the specific change in length of the clamping elements under the effect of fluctuations in temperature and/or centrifugal forces, which depends on the coefficient of expansion and the modulus of elasticity of the material used, has the effect, because of the great length of the clamping elements, of giving rise to considerable absolute changes in length which cannot be accommodated by the prestressing of the clamping elements and which result in loosening of the butt connection.

U.S. Pat. No. 3,310,327 A1 also discloses the butt connection described in the opening part of this specification, which serves for connecting prefabricated component parts of buildings or the like. Fixed to the ends of the straps are bolts which engage over their entire length into the full material of the component parts.

SUMMARY OF THE INVENTION

In accordance with the invention the butt connection known from U.S. Pat. No. 3,310,327 A1 is used with the proviso that the component parts are divided hollow profile members, in particular rotor blades of wind power installations, and the straps are arranged along the joint at the periphery of the profile member parts. That attains the object of developing a butt connection which does not seriously influence the aerodynamic properties of the rotor blade, which is of low weight, and which in particular is capable of withstanding the considerable fluctuating loads to which the rotor blades are exposed in operation of a wind power installation, without involving the risk of coming loose. The straps replace entirely the one-piece flange connection which is conventionally usual for connecting hollow profile members or the also one-piece tensile anchor connection known from DE 29 21 152 A1; they are substantially lighter than that and can be arranged distributed over the periphery of the hollow profile member discretely at different spacings from each other, namely in dependence on the forces to be transmitted at the joint line, so that the design of the connection—with very good application of the forces involved—is simpler in terms of its operating strength, than when using one of the known flange or tensile anchor connections. Although this kind of connection can also be used for longitudinally divided hollow profile members (rotor blades), it is suitable in particular for transversely divided hollow profile members of non-round cross-section, with the bars or straps being arranged at the periphery of the hollow profile member.

The freedom from maintenance of the new butt connection is of particular advantage because the connection is not self-releasing and therefore there are no prestressing losses that also have to be tolerated.

Preferably each strap connection comprises double bars or straps with a respective bar or strap arranged on the outside and on the inside of the hollow profile member. In addition it is advantageously provided that each strap can be prestressed with a defined tensile force. A sufficiently high tensile force prestressing provides that, in spite of an alternate loading (tensile force/compression force) in the course of a revolution of the rotor, the situation at the butt connection still remains one involving tensile forces and it is only the magnitude of such forces that changes over the course of a revolution.

In order to apply the tensile force prestressing required for that purpose to the individual straps which jointly form the butt connection, it is preferably provided that each strap is fixed to the hollow profile member parts by means of two bolts and at least one of the bolts, in the respective contact region with the strap or straps, has a wedge-shaped flattening in its axial direction and is held non-rotatably. Alternatively the bolt could also be of a part-conical configuration, and then it can also be rotated. At any event, when fixing the straps, when they are pushed with their (suitably configured) ends over the bolt and urged in a direction towards the surface in question of the hollow profile member, at the same time tensile force prestressing is built up in the longitudinal direction of the strap and thus perpendicularly to the joint line. In order to implement that in a simple fashion, the bolt advantageously comprises a sleeve provided with the wedge-shaped flattenings, and a screw which passes axially through the sleeve and which has a nut, wherein both the screw head and also the nut press by means of cup-like pressure portions against the associated strap and prestress same by movement along the wedge surface (or cone surface).

A further alternative form of the prestressing mechanism can provide that at least one of the bolts, in the respective contact regions with the straps, has a bulge which is eccentric with respect to its axis. By rotating the bolt—which moreover does not need to be rotated to fix the straps—it is also possible in that way to produce the desired tensile force prestressing in the strap.

Also disclosed is method for connecting a first and a second section of a rotor blade for a wind power installation to each other, each section having a hollow region, the method comprising: attaching a plurality of first fixtures near a connecting edge of the first section of the rotor blade, the first fixtures having a portion outside of the rotor blade and a portion in a hollow region of the rotor blade; attaching a plurality of second fixtures near a connecting edge of the second section of the rotor blade, the second fixtures having a portion outside of the rotor blade and a portion in a hollow region of the rotor blade; positioning the connecting edge of the first section adjacent to the connecting edge of the second section; connecting respective first fixtures to respective second fixtures with connecting members that extend across the connecting edges between the first and second fixtures; and placing a tensile stress on the connecting members to apply a compression of the first and second members together. The step of placing tensile stress on the connecting members comprises applying a pressure to the connecting members that forces the connecting members to an area of greater cross section on a fixture. The step of placing tensile stress on the connecting members may comprise rotating a fixture so that the pressure portion of the fixture is positioned to increase pressure on the connecting member.

BRIEF DESCRIPTION OF THE FIGURES

The drawing illustrates the invention by means of an embodiment. In the drawing.

DETAILED DESCRIPTION OF THE INVENTION

Figure 1:
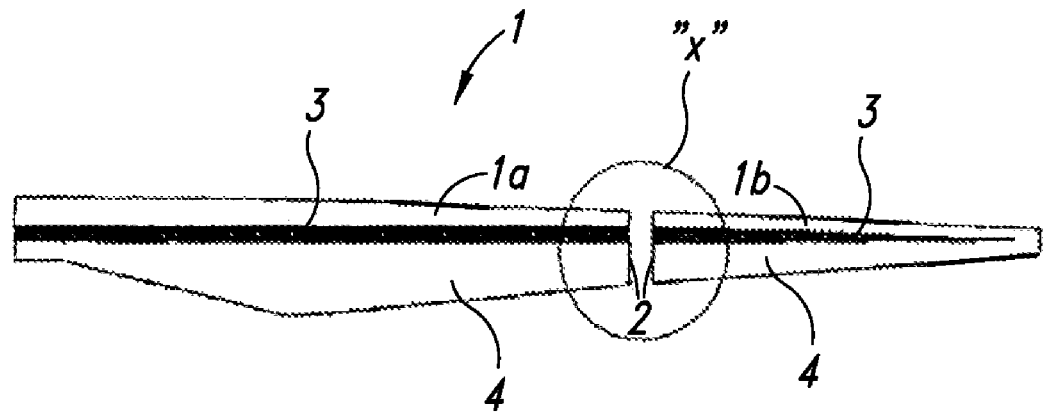
FIG. 1 shows a plan view of a (singly) transversely divided rotor blade for the rotor of a wind power installation in the form of a diagrammatic cross-section (the gap between the parts serves only for enhanced clarity of the drawing)

FIG. 1 is a diagrammatic view in cross-section of a transversely divided rotor blade of a wind power installation. The joint 2 between the parts 1a and 1b of the rotor blade 1 is open. The two rotor blade parts 1a and 1b comprise a load-bearing core profile member 3 and an aerodynamically shaped shell portion 4.

Figure 2:
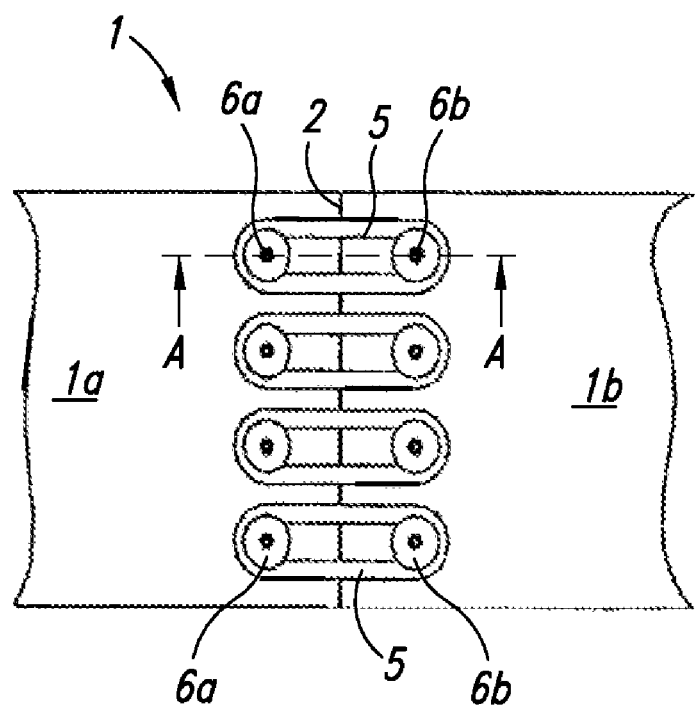
FIG. 2 shows a plan view of the portion x of the butt connection according to the invention between the two rotor blade parts in FIG. 1.

FIG. 2 is a plan view showing a part of the butt connection between the parts 1a and 1b of the rotor blade 1 when the joint 2 is closed. The butt connection comprises a plurality of connecting members (e.g., bars or straps) 5 which bridge over the joint 2 and which are respectively fixed by means of first and second fixtures (e.g., bolts) 6a, 6b to both rotor blade parts 1a, 1b.

Figure 3:
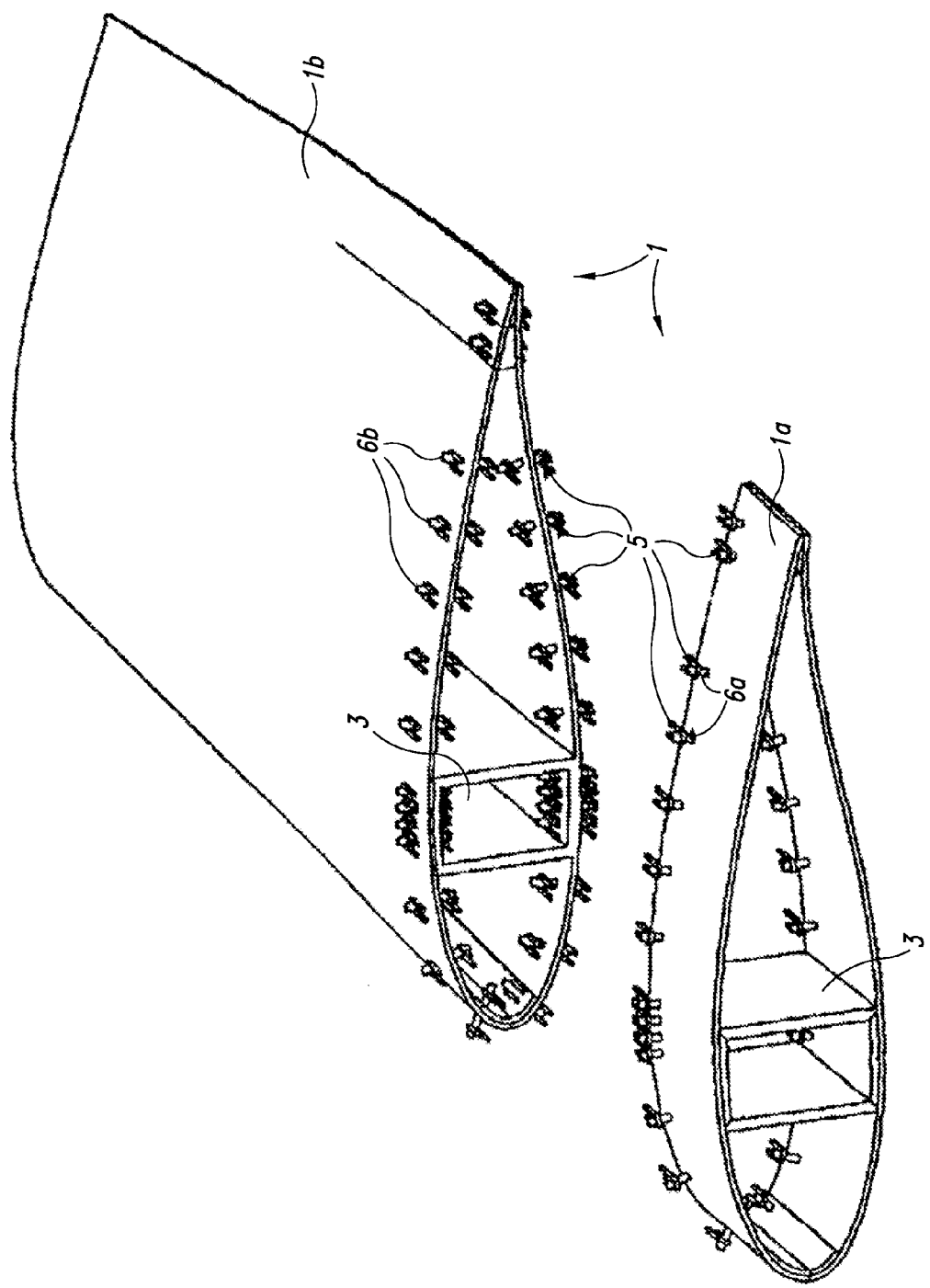
FIG. 3 shows a perspective view of the entire butt connection between the two rotor blade parts in FIG. 1, but which is opened up as in FIG. 1.

In FIG. 3—as in FIG. 1—the joint 2 is opened, and portions of the two rotor parts 1a, 1b are shown in a perspective view. The connecting members 5 (e.g., bars or straps) are also cut away (only for the purposes of clearer illustration) and the overall view of the (opened) butt connection shows how the connecting members 5 with their first and second fixtures 6a, 6b are distributed over the—non-round—cross-section of the divided hollow profile member. The arrangement of the connecting members 5 is at its densest in the region of the core profile member 3 because it is there that the highest transmission of forces occurs; in the other regions, there are larger spacings between the connecting members 5.

Figure 4:
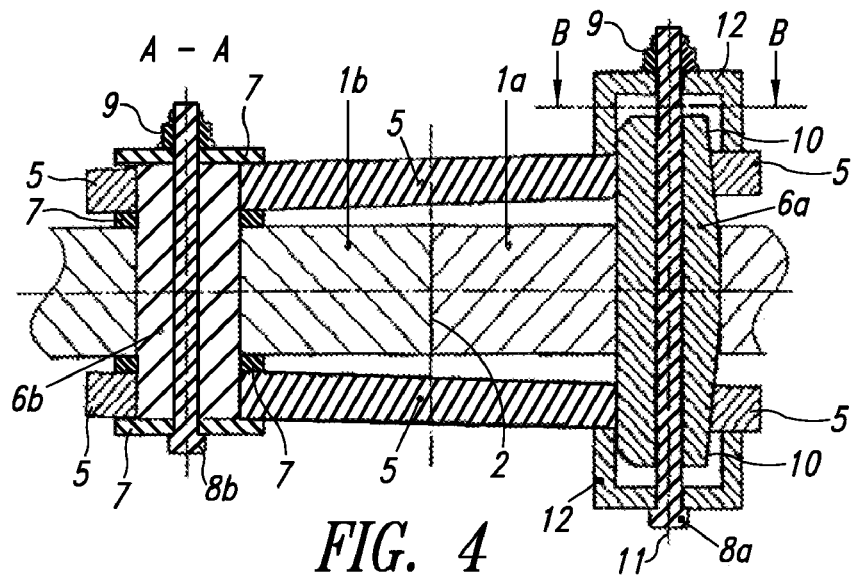
FIG. 4 shows a partial view taken along line A-A in FIG. 2.
Figure 5:
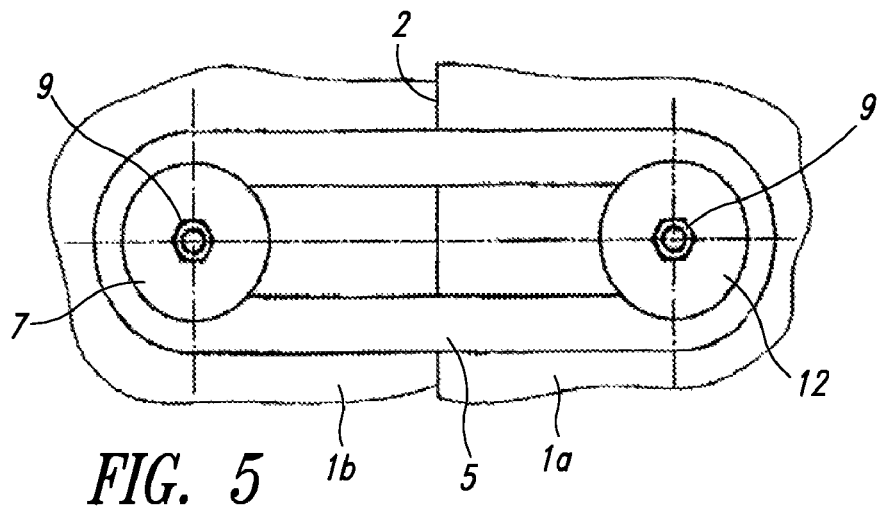
FIG. 5 shows a plan view of the strap connection in FIG. 4.
Figure 6:
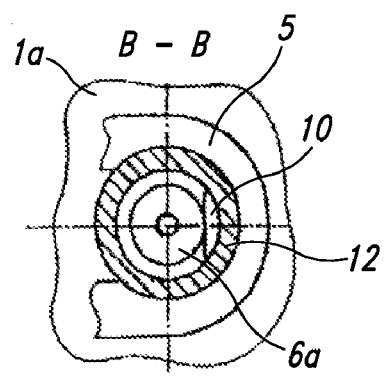
FIG. 6 shows a partial view taken along line B-B in FIG. 4.

FIGS. 4 to 6 show a strap connection in detail. A respective connecting member 5 is arranged above and below the hollow profile member parts 1a, 1b. Both connecting members 5 are fixed to the part 1b by means of the second fixture 6b, with the interposition of washers 7, by a screw 8a, 8b with nut 9. Fixing of the connecting members 5 to the part 1a is similar, but the first fixture 6a has wedge-shaped flattened portions 10 which taper from the center of the bolt towards its ends and towards the axis 11 of the (longer) screw 8a with nut 9. Cup-like pressure portions 12 are provided between the head of the screw 8a, 8b and the connecting member 5 adjacent thereto on the one hand and between the nut 9 and the connecting member 5 adjacent thereto on the other hand. When the screw 8a, 8b with the nut 9 is tightened, the pressure portions 12 exert corresponding forces on the connecting members 5; the approach movement thereof, in particular towards the profile member part 1a, causes them to slide upwardly along the flattened portions 10 of the first fixture 6a, whereby a tensile stress is built up in the connecting members 5 (in the contact regions of the connecting members 5 with the flattened portions 10, the inside wall of the connecting members 5 can be adapted to the surfaces of the flattened portions 10). The tensile stress in the connecting members 5 results in a closing pressure stress applied to the hollow profile parts 1a, 1b in the region of their joint 2.

The invention claimed is:

1. A blade for a wind turbine, the blade having a hollow profile and having a root portion adjacent to an axis of rotation of the wind turbine and a tip portion spaced away from the axis of rotation, the blade extending from the axis of rotation to the tip portion, the blade comprising:
    a first rotor blade part having a first end positioned between the tip portion of the blade and the axis of rotation of the wind turbine and a second end spaced longitudinally along the rotor blade away from the first end, positioned closer to the tip portion of the blade than the first end;
    a second rotor blade part having a first end abutting with the second end of the first rotor blade part;
    a plurality of first fixtures coupled to the second end of the first rotor blade part;
    a plurality of second fixtures coupled to the first end of the second rotor blade part;
    a plurality of connecting members that respectively extend from a respective first fixture on the first rotor blade part to a respective second fixture on the second rotor blade part, the connecting members having a tensile stress placed thereon to apply compression between the first rotor blade part and the second rotor blade part to form a rotor blade portion composed of the first and second rotor blade parts having a butt joint at which they are held together by the connecting members.

2. The rotor blade according to claim 1 wherein some of the first and second fixtures are on an outside surface of the first and second parts, respectively and some of the first and second fixtures are on an inside surface of the first and second parts, respectively, to provide the connecting members on the outside and on the inside of the blade.

3. The rotor blade according to claim 1 wherein the spacing between adjacent first fixtures is smaller at a curved region near a leading edge of the rotor blade than it is at flat regions near a trailing edge of the rotor blade.

4. The rotor blade according to claim 1 wherein at least one of the first and second fixtures has a flat wedge shaped portion that tapers towards an axis of the fixture such that an end portion of the fixture has a smaller cross section than a center portion of the fixture.

5. The rotor blade according to claim 4 wherein the tensile stress is applied to a connecting member by applying a pressure to the connecting member that forces the connecting member to an area of greater cross section on a fixture.

6. The rotor blade according to claim 1 wherein at least one of the first and second fixtures is rotatable and comprises a pressure portion which is eccentric with respect to an axis of the fixture.

7. The rotor blade according to claim 6 wherein the tensile stress is applied by rotating a fixture so that the pressure portion on the fixture is positioned to increase pressure on the connecting member.

8. A rotor blade for a wind power installation comprising:
a first and a second section of the rotor blade connected to each other along a connection edge, each section having a hollow profile;
a plurality of first fixtures attached to the first section of the rotor blade near the connection edge, each first fixture having a portion inside a hollow area of the rotor blade and a portion outside of the rotor blade;
a plurality of second fixtures attached to the second section of the rotor blade near the connection edge, each second fixture having a portion inside a hollow area of the rotor blade and a portion outside of the rotor blade; and
a plurality of connecting members extending across the connection edge to connect respective first fixtures to respective second fixtures, each first fixture being connected to a respective second fixture both by a connection member in the hollow area and by a connection member on the outside of the rotor blade.

9. The rotor blade according to claim 8 wherein at least one of the first and second fixtures has a flat wedge shaped portion that tapers towards an axis of the fixture such that an end portion of the fixture has a smaller cross section than a center portion of the fixture.

10. The rotor blade according to claim 9 wherein a tensile stress is applied to a connecting member by applying a pressure to the connecting member that forces the connecting member to an area of greater cross section on a fixture.

11. The rotor blade according to claim 8 wherein at least one of the first and second fixtures is rotatable and comprises a pressure portion which is eccentric with respect to an axis of the fixture.

12. The rotor blade according to claim 11 wherein a tensile stress is applied to a connecting member by rotating a fixture so that the pressure portion on the fixture is positioned to increase pressure on the connecting member.

13. A butt joint for connecting a first and a second section of a rotor blade of a wind power installation, the first and second section being connected along a connection edge and having a hollow profile, the butt joint comprising:
a plurality of first fixtures attached to the first section of the rotor blade and arranged adjacent the connection edge, each first fixture having a portion within the hollow profile and a portion outside of the rotor blade;
a plurality of second fixtures attached to the second section of the rotor blade and arranged adjacent the connection edge, each second fixture having a portion within the hollow profile and a portion outside of the rotor blade;
a plurality of connecting members each connecting a first fixture to a second fixture and extending across the connection edge, each first fixture being connected to a respective second fixture both by a connection member in the hollow area and by a connection member on the outside of the rotor blade.

14. The butt joint according to claim 13 wherein at least one of the first and second fixtures has a flat wedge shaped portion that tapers towards an axis of the fixture such that an end portion of the fixture has a smaller cross section than a center portion of the fixture.

15. The butt joint according to claim 14 wherein a tensile stress is applied to a connecting member by applying a pressure to the connecting member that forces the connecting member to an area of greater cross section on a fixture.

16. The butt joint according to claim 13 wherein at least one of the first and second fixtures is rotatable and comprises a pressure portion which is eccentric with respect to an axis of the fixture.

17. The butt joint according to claim 16 wherein a tensile stress is applied to a connecting member by rotating a fixture so that the pressure portion on the fixture is positioned to increase pressure on the connecting member.

18. A method for connecting a first and a second section of a rotor blade for a wind power installation to each other, each section having a hollow region, the method comprising:
attaching a plurality of first fixtures near a connecting edge of the first section of the rotor blade, the first fixtures having a portion outside of the rotor blade and a portion in a hollow region of the rotor blade;
attaching a plurality of second fixtures near a connecting edge of the second section of the rotor blade, the second fixtures having a portion outside of the rotor blade and a portion in a hollow region of the rotor blade;
positioning the connecting edge of the first section adjacent to the connecting edge of the second section;
connecting respective first fixtures to respective second fixtures with connecting members that extend across the connecting edges between the first and second fixtures; and
placing a tensile stress on the connecting members to apply a compression of the first and second members together.

19. A method for connecting a first and a second section of a rotor blade for a wind power installation to each other, each section having a hollow profile, the method comprising:
attaching a plurality of first fixtures near a connecting edge of the first section;
attaching a plurality of second fixtures near a connecting edge of the second section;
positioning the connecting edge of the first section adjacent to the connecting edge of the second section;
connecting respective first fixtures to respective second fixtures with connecting members that extend across the connecting edges between the first and second fixtures; and
placing a tensile stress on the connecting members to apply a compression of the first and second members together, at least one of the first and second fixtures having a flat wedge shaped portion that tapers towards an axis of the fixture such that an end portion of the fixture has a smaller cross section than a center portion of the fixture.

20. The method according to claim 19 wherein the step of placing tensile stress on the connecting members comprises:
applying a pressure to the connecting members that forces the connecting members to an area of greater cross section on a fixture.

21. A method for connecting a first and a second section of a rotor blade for a wind power installation to each other, each section having a hollow profile, the method comprising:
attaching a plurality of first fixtures near a connecting edge of the first section;
attaching a plurality of second fixtures near a connecting edge of the second section;
positioning the connecting edge of the first section adjacent to the connecting edge of the second section;

connecting respective first fixtures to respective second fixtures with connecting members that extend across the connecting edges between the first and second fixtures; and placing a tensile stress on the connecting members to apply a compression of the first and second members together, at least one of the first and second fixtures being rotatable and comprising a pressure portion which is eccentric with respect to an axis of the fixture.

22. The method according to claim 21 wherein the step of placing tensile stress on the connecting members comprises:

rotating a fixture so that the pressure portion on the fixture is positioned to increase pressure on the connecting member.

23. The method according to claim 18 wherein each fixture has an end thereof in the hollow portion of the rotor blade, the respective first and second fixtures being connected to each other both by a connecting member in the hollow portion of the rotor blade and by a connecting member on an outside portion of the rotor blade.

* * * * *